United States Patent
Kawabe et al.

[19]

[11] Patent Number: 6,001,299
[45] Date of Patent: *Dec. 14, 1999

[54] PROCESS AND APPARATUS FOR MANUFACTURING AN ELECTRET ARTICLE

[75] Inventors: Masaaki Kawabe; Daisuke Ito, both of Ibaraki, Japan

[73] Assignee: Japan Vilene Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/910,879

[22] Filed: Aug. 13, 1997

Related U.S. Application Data

[63] Continuation of application No. 08/604,253, Feb. 21, 1996, abandoned.

[30] Foreign Application Priority Data

Feb. 21, 1995 [JP] Japan ..................................... 7-056529
Oct. 31, 1995 [JP] Japan ..................................... 7-306632

[51] Int. Cl.[6] ............................. B29C 33/08; B29C 35/12
[52] U.S. Cl. .......................... 264/436; 264/448; 264/451; 264/440; 425/174.8 E; 425/174.8 R
[58] Field of Search ..................................... 264/435, 436, 264/446, 449, 448, 451, 438, 439, 440; 425/174.8 E, 174.8 R

[56] References Cited

U.S. PATENT DOCUMENTS

| 3,793,715 | 2/1974 | Murayama et al. | 29/592 |
| 3,998,916 | 12/1976 | Van Turnhout | 264/436 |
| 4,308,370 | 12/1981 | Fukada et al. | 264/435 |

(List continued on next page.)

FOREIGN PATENT DOCUMENTS 61-282471  12/1986  Japan ..................................... 264/436
61-285710  12/1986  Japan ..................................... 264/436

OTHER PUBLICATIONS

Derwent Abstract of Japanese Ex. Pat. Publ. No. 3–54620 (=JP 91054620) Dec. 1986.

(List continued on next page.)

*Primary Examiner*—Angela Ortiz
*Attorney, Agent, or Firm*—Sughrue, Mion, Zinn, Macpeak & Seas, PLLC

[57] ABSTRACT

A process for electret treatment is described, involving
(1) placing the dielectric article between a combination of a first ion-repulsive electrode and a first ion-attractive electrode and between a combination of a second ion-repulsive electrode and a second ion-attractive electrode, under a specified arrangement;
(2) supplying a first positive ion and a first negative ion from a first ion generating means between the dielectric article and the first ion-repulsive electrode, the first ion generating means being selected from an alternating current surface discharge element and an alternating current corona-type ion generating element;
(3) applying a direct current voltage between the first ion-repulsive electrode and the first ion-attractive electrode to produce a first potential difference therebetween, whereby only one of the first positive and negative ions is moved in a specified direction, and is transferred on the dielectric article;
(4) supplying a second positive ion and a second negative ion from a second ion generating means between the dielectric article and a second ion-repulsive electrode, the second ion generating means being selected from specified elements; and
(5) applying a direct current voltage between the second ion-repulsive electrode and the second ion-attractive electrode to produce a second potential difference therebetween, whereby only the second ion having polarity opposite to polarity of the first ion transferred on the dielectric article is moved in a specified direction, and is transferred on the dielectric article.

26 Claims, 7 Drawing Sheets

U.S. PATENT DOCUMENTS

| | | | |
|---|---|---|---|
| 4,375,718 | 3/1983 | Wadsworth et al. | 264/436 |
| 4,459,634 | 7/1984 | Stefanou | 361/233 |
| 4,517,143 | 5/1985 | Kisler | 425/174.8 E |
| 4,588,537 | 5/1986 | Klaase et al. | 264/436 |
| 4,592,815 | 6/1986 | Nakao . | |
| 4,692,285 | 9/1987 | Bloomfield et al. | 264/435 |
| 4,810,432 | 3/1989 | Kisler | 425/174.8 E |
| 5,310,511 | 5/1994 | Marcus | 264/435 |

OTHER PUBLICATIONS

Derwent Abstract of Japanese Ex. Pat. Publ. No. 4,–8539 (=JP 92008539) Dec. 1986.

Cover page with English Summary of Seidenki–Gakkai–Shi (Journal of Electrostatics Association), vol. 18, No. 2 (1994), pp. 119–227.

Cover page with English Summary of Seidenki–Gakkai–Shi (Journal of Electrostatics Association), vol. 18, No. 5 (1994), pp. 444–448.

PROCESS AND APPARATUS FOR MANUFACTURING AN ELECTRET ARTICLE

This is a Continuation of application Ser. No. 08/604,253 filed Feb. 21, 1996, now abandoned.

BACKGROUND OF THE INVENTION

1. Field of the Invention

The present invention relates to a process and apparatus for manufacturing an electret article. According to the present invention, a dielectric article can be efficiently polarized to obtain, for example, a surface-charged electret article, a surface of which is considerably hetero-charged, namely, charged with both positive and negative ions; or a piezoelectric or pyroelectric electret article.

2. Description of the Related Art

Hitherto, a direct current (DC) corona charging process was generally used in the manufacture of a surface-charged electret article, such as electret fibrous sheet, as disclosed in, for example, Japanese Examined Patent Publications No. 3-54620, No. 4-8539, and No. 5-83283. In the conventional process, as shown in FIG. 1, an electret treatment of a fibrous sheet 1 was carried out by bringing the fibrous sheet 1 to be treated into contact with an electrically grounded electrode 8, such as a stainless steel drum or water electrode, and applying a high DC voltage between the grounded electrode 8 and a discharge electrode 9, such as a wire or needle electrode to thereby perform an electret treatment of the fibrous sheet 1 with a DC corona discharge.

In the resulting electret fibrous sheet, charges are maintained in the form of polarized charges within the fibers of the sheet. The surface to which the high DC voltage was applied is generally charged with the polarity same as the applied polarity, whereas the surface which is brought into contact with the grounded electrode is charged with the polarity opposite to the applied polarity. However, the degree and duration of the charging was not satisfactory.

The DC corona discharge used in the electret treatment is based on a considerably unequal electric field generated between the needle electrode 9 and plane electrode 8 shown in FIG. 1. It is necessary to produce more than a certain degree of an electric intensity between the needle electrode 9 and plane electrode 8, namely, a voltage for initiating the corona discharge or more, to generate the corona discharge. The wide distance between the needle electrode 9 and the plane electrode 8 requires the higher initiating voltage.

For example, when the article to be treated is charged by the corona discharge, and the potential difference between the surface of the article and the corona discharge electrode (needle electrode) 9 becomes lower than the initiating voltage of the corona discharge, the corona discharge ceases. This is because the discharge electrode is always associated with the counter electrode (grounded electrode) in the DC corona discharge. It is necessary to increase the voltage, if the surface potential, i.e., the surface charge, on the article 1 to be treated is needed to be higher. However, if the voltage becomes too high, a spark discharge may occur between the electrodes through weak portions of the article to be treated, to thereby damage the article, for example, by boring holes.

Further, when a thick non-woven fabric, such as a felt, is treated, the surface confronting the discharge electrode 9 is not sufficiently charged, and thus, the opposite-polarity charges are not injected from the grounded electrode into the opposite surface. Therefore, the felt cannot be sufficiently charged as a whole. When the resulting felt was used as a filter, satisfactory effect was not obtained. [See "Seidenki-Gakkai-Shi (Journal of Electrostatics Association)", Vol. 18, No. 2 (1994), pp. 119 to 127; and Vol. 18, No. 5 (1994), pp. 444 to 448.]

Further, in the conventional process using DC corona discharge, it is necessary to bring the article, such as a fibrous sheet, into intimate contact with a surface of the plane electrode, such as a stainless steel drum. Therefore, non-planar articles, such as a face mask or a pleated fibrous product, were not able to be charged after shaping procedures. Hitherto, the shaping procedures were carried out after charging the starting fibrous materials. There was a defect that charges were lost during the shaping procedures.

The effect of the electret treatment is gradually lost when the electret article is used for a long time, and sometimes, the electret treatment is desired again. If the article has a nonplanar structure, it is very difficult to repeat the electret re-treatment in the conventional process.

The electret articles exhibiting piezoelectric effect, namely, piezoelectric electret articles, are used in, for example, acoustic elements or displacement elements, using piezoelectric property. The conventional process of producing such a piezoelectric electret article comprises bringing the surface of the article to be treated into contact with an electrode, and applying a high voltage.

When the piezoelectric electret article is produced, generally, the article can be easily polarized by applying a high voltage to the starting article, or by treating the starting article at a high temperature below Curie temperature. The Curie temperature means the temperature where a phase transition occurs, and a piezoelectric effect which have appeared below Curie temperature will disappear above Curie temperature.

If a DC voltage higher than a certain voltage is applied between electrodes in the air, a discharge may occur between electrodes at the edge of the article to cause dielectric breakdown (insulation breakdown) of the air. When the dielectric breakdown occurs, a high voltage cannot be maintained. Thus, the polarization effectiveness is extremely lowered. If the temperature of the article to be treated is elevated by a heater or infrared radiation, the article can be easily polarized by applying a high DC voltage in the air. However, the temperature of the air is also elevated, and the dielectric breakdown of the air easily occurs.

Therefore, as shown in FIG. 2, the dielectric article 2 to be treated was hitherto polarized by attaching, to the surfaces of the dielectric article 2 which have been formed into a predetermined shape, a pair of electrodes 3a, 3b having surface areas narrower than those of the dielectric article 2; and applying a high DC voltage between the electrodes 3a, 3b, while dipping the dielectric article 2 and the electrodes 3a, 3b in an insulating oil 4. For example, a ceramic material as the dielectric article 2 was polarized by sintering a green sheet, coating a silver paste on both sides, baking the coated sheet to form the electrodes 3a, 3b on the surfaces of the dielectric article 2, dipping the dielectric article 2 together with the electrodes 3a, 3b in the insulating oil 4, and applying a high DC voltage while avoiding the dielectric breakdown of the air. The treatment is carried out at about 100° C. by heating the insulating oil 4 so as to enhance polarization effectiveness. It is difficult to further raise the temperature of the insulating oil 4. Therefore, the conventional process can avoid the dielectric breakdown, but had a defect that polarization effectiveness was still poor.

In the conventional process as shown in FIG. 2, it is necessary to attach the electrodes 3a, 3b to the surface of the dielectric article 2. Therefore, there was another defect that the dielectric breakdown was liable to occur in the dielectric article 2. This is because if the dielectric article 2 has the finely rugged or rough surfaces, and then, the electrodes 3a, 3b have the corresponding finely rugged or rough surfaces, the electric intensity was sometimes concentrated in the fine recessions to cause the dielectric breakdown. Further, if the dielectric breakdown occurred by other causes, the charges accumulated in the electrodes which were closely attached were sometimes immediately poured into the dielectric breakdown portion all together to damage the dielectric article. After the dielectric breakdown occurred, the voltage was not raised, and the damage became severer. The dielectric article having the wider surfaces to be polarized provides not only a higher possibility of the dielectric breakdown, but also a larger amount of the accumulated charges poured into the dielectric breakdown portion. Therefore, it was difficult to treat the dielectric article having the wide surfaces to be polarized. The shape of the dielectric article to be treated was limited, because it was necessary to attach the electrodes thereto. Further, the conventional process required the attachment of the electrodes to the article to be treated and dipping into the insulating oil, and thus, the procedure was troublesome and was not suitable to a continuous treatment.

SUMMARY OF THE INVENTION

Accordingly, the object of the present invention is to provide a means of an electret treatment, wherein a size and/or a shape of a dielectric article to be treated are not limited because the dielectric article does not need to be brought into contact with electrodes, and thus, a nonplanar and/or a thick articles can be efficiently treated, a high voltage can be applied, a temperature of the article can easily be controlled if necessary, the article is hardly damaged by spark discharge, dielectric breakdown or the like, and satisfactory and lasting charges can be obtained.

Other objects and advantages will be apparent from the following description.

In accordance with the present invention, there is provided a process for manufacturing an electret article, comprising (1) a first transferring step of placing a dielectric article to be treated, between and apart from a first ion-repulsive electrode and a first ion-attractive electrode, said first ion-repulsive electrode and said first ion-attractive electrode being opposed to each other, and a first potential difference being applied between said first ion-repulsive and ion-attractive electrodes by a direct current voltage;

supplying a first positive ion and a first negative ion from a first ion generating means between said dielectric article and said first ion-repulsive electrode; and moving only one of said first positive and negative ions in a direction from said first ion-repulsive electrode to said first ion-attractive electrode due to said potential difference, to thereby transfer one of said first positive and negative ions on said dielectric article; and, (2a) a second transferring step of supplying a second positive ion and a second negative ion from a second ion generating means between said dielectric article and a second ion-repulsive electrode, said second ion-repulsive electrode being apart from said dielectric article and located at a side opposite to said first ion-repulsive electrode with respect to said dielectric article; and moving only an ion having polarity opposite to polarity of said transferred first ion in a direction from said second ion-repulsive electrode to a second ion-attractive electrode due to a second potential difference, to thereby transfer said opposite-polarity ion on said dielectric article, said second ion-attractive electrode being apart from said dielectric article and located at a side opposite to said first ion-attractive electrode with respect to said dielectric article, and said second potential difference being applied between said second ion-repulsive and ion-attractive electrodes by a direct current voltage; or (2b) a second transferring step of supplying a second positive ion or a second negative ion from a second ion generating means which is apart from said dielectric article and located at a side opposite to said first ion-repulsive electrode with respect to said dielectric article; and moving only an ion having polarity opposite to polarity of said transferred first ion in a direction from said second ion generating means to said dielectric article, due to an attractive force of said dielectric article, to thereby transfer said opposite-polarity ion on said dielectric article.

In a preferred embodiment of the present invention, said first transferring step (1) and said second transferring step (2a) or (2b) are carried out substantially at the same time.

Further, the present invention relates to an apparatus for manufacturing an electret article, comprising an ion-repulsive electrode;

an ion-attractive electrode opposingly located to said ion-repulsive electrode;

a means for placing a dielectric article to be treated, apart from and between said ion-repulsive electrode and said ion-attractive electrode;

an ion generating means capable of supplying positive and/or negative ions between said ion-repulsive electrode and said dielectric article placed by said means for placing said dielectric article; and a means for generating a potential difference between said ion-repulsive electrode and said ion-attractive electrode by applying direct current voltage, to thereby move only one of said positive and negative ions supplied from said ion generating means in a direction from said ion-repulsive electrode to said ion-attractive electrode and transfer said ion to said dielectric article.

DESCRIPTION OF THE PREFERRED EMBODIMENTS

Figure 1:
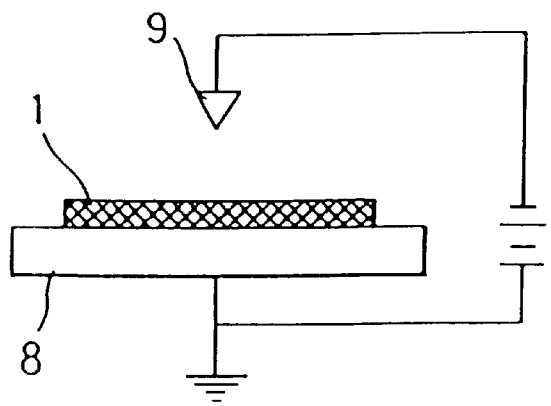
FIG. 1 is a sectional view schematically illustrating a conventional apparatus for a corona discharge.
Figure 2:
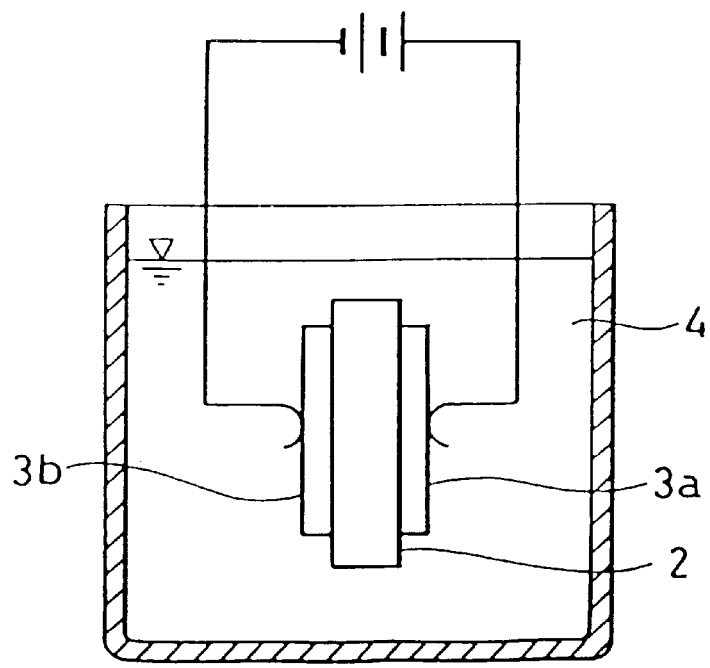
FIG. 2 is a sectional view schematically illustrating a conventional apparatus for manufacturing a piezoelectric article.

The present invention will be explained in detail hereinafter.

The term "electret article" used herein means a dielectric article at least a portion of which is polarized. There are generally various types of polarized states in an electret, for example, the polarized state only in at least a porion of a surface, the polarized state in a surface and the portion adjacent thereto, the polarized state not only in a surface and the portion adjacent thereto, but also in a deep inside of the electret article. All the electret articles having said polarized states are encompassed in the present invention. Therefore, the electret article of the present invention includes a surface-charged electret article wherein the surfaces and optionally the portions adjacent thereto are polarized, an electret article wherein not only the surfaces and the portions adjacent thereto, but also deep insides are polarized, such as a piezoelectric or pyroelectric article.

The differences of the polarized states in the electret article of the present invention are caused by, for example, the kinds or shapes of the dielectric article to be treated, or conditions of the electret treatment.

For example, when a fibrous sheet or film made of a dielectric material of polyolefin resin, such as polyethylene or polypropylene, polyester resin, polycarbonate resin is subject to the electret treatment of the present invention, positive and negative charges are trapped mainly in the surfaces and the portions adjacent thereto, or further in slightly inside portions to produce polarization states in the electret article and an electric field outside the electret article.

When an inorganic ferroelectrics, such as barium titanate, is subject to the electret treatment, the titanium ion ($Ti^{4+}$) in the crystalline structure is displaced by applying electric field, the displacement causes polarization in a molecular level, and then, a structure containing continuous micropolarizations (dipoles) from the surfaces to deeply inside portions is obtained. The resulting electret article of barium titanate or the like exhibits piezoelectric property, but hardly produce an electric field outside the electret article.

According to the present invention, any shaped article made of any organic or inorganic material which is dielectric can be treated to obtain an electret article. As examples of organic dielectric material, there may be mentioned various organic polymer materials, for example, polyolefin, such as polyethylene or polycarbonate, polyvinyl chloride, fluoroethylene propylene copolymer (FEP), polyvinylidene fluoride (PVDF), fluorovinylidene-trifluoroethylene copolymer, or the like. Of the above materials, fluoroethylene propylene copolymer (FEP), polyvinylidene fluoride (PVDF) and fluorovinylidene-trifluoroethylene copolymer are ferroelectrics. When such ferroelectrics are treated according to the present invention, a piezoelectric or pyroelectric article can be obtained.

Inorganic dielectric material is, for example, a ceramic material. It is preferable to use particularly, lead zirconate titanate (PZT), lead titanate, or barium titanate.

Further, a composite material of inorganic and organic materials may be used in the present invention. Examples of the composite materials are combinations of piezoelectric ceramic material and rubber, or piezoelectric ceramic material and thermoplastic resin, such as polyacetal, polyvinylidene fluoride.

In the conventional process, it was necessary to place the article to be treated with contacting at least one electrode, and thus, the shape of the article was limited to a sheet or film having a thickness which can be placed between the electrodes, whereas such a limitation is generally eliminated in the present invention. More particularly, the dielectric article to be treated may be of any shapes in the present invention, so long as the dielectric article to be treated, an ion generating means, an ion-repulsive electrode, and an ion-attractive electrode can be placed in such a space that positive or negative ions supplied from the ion generating means can be moved in a direction from the ion-repulsive electrode to the ion-attractive electrode, and transferred to the dielectric article.

The article which may be treated in the present invention includes any molded articles, for example, a polyhedral, columnar, cylindrical, spherical, hemispherical, spheroidal, conical or pyramidal article, or a plane or corrugated plate, sheet, film, pipe or the like. In the conventional processes, it was necessary to carry out a forming process to a final product after an electret treatment, whereas the electret treatment can be carried out after the shape of the final product is formed, for example, a face mask is obtained by forming the shape corresponding to a human face. Further, the article which may be treated in the present invention can be porous or non-porous. The porous article includes a fibrous or foam article.

The fibrous porous article is made of, for example, woven, knitted, fibrous porous film, or nonwoven fabric. The examples of nonwoven fabrics are a dry, span-bonded, melt-blown, hydro-entangled, and wet nonwoven fabrics. The fibrous porous articles as above contain many pores having relatively large diameters. Therefore, when the fibrous porous article made of ferroelectric material is treated in the present invention, a surface-charged electret article is generally obtained. A sheet of melt-blown or hydro-entangled nonwoven fabric which is free from a textile oil or adhesive is suitable to the manufacture of the surface-charged electret article.

The porous article is, for example, an open-cell type porous article made of polyolefin, polyester or polyurethane resin, or the like.

The first and second ion generating means which may be used in the present invention are not limited, so long as they can generate positive and/or negative ions used for charging the dielectric article. It is possible to use, for example, an AC surface discharge element, ionizer element, DC corona-type ion generating element, or AC corona-type ion generating element. It is preferable to use the AC surface discharge element which can generate abundant ions and easily stably cause discharge.

Figure 3:
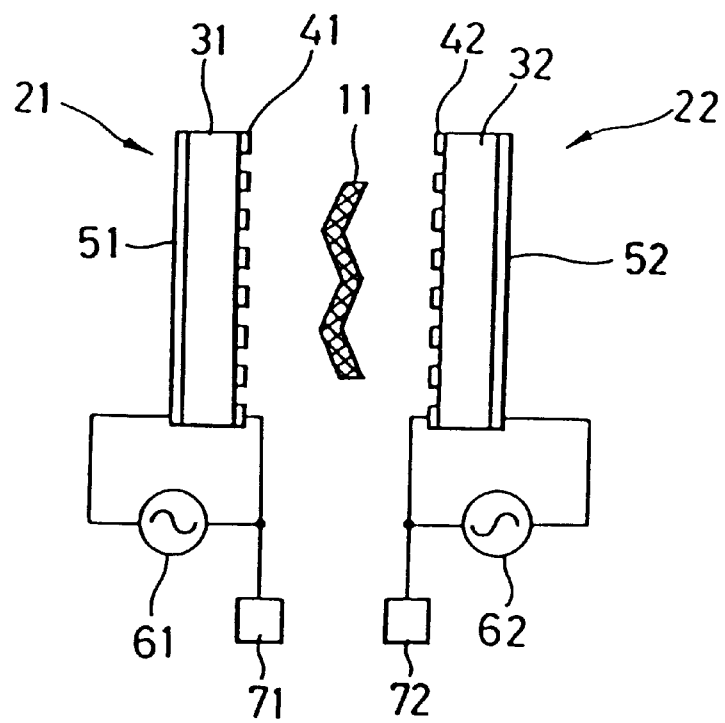
FIG. 3 is a sectional view schematically illustrating an embodiment of the present apparatus using a pair of the alternating current (AC) surface discharge elements.

A typical embodiment of the present invention wherein the AC surface discharge elements are used as the first and second ion generating means is shown in FIG. 3.

In this embodiment, two AC surface discharge elements 21, 22 are located opposingly to each other, and apart from each other. The AC surface discharge elements 21, 22 carry discharge electrodes 41, 42 on one side of dielectric layers 31, 32, and inducing electrodes 51, 52 on the other side of the dielectric layers 31, 32, respectively. The AC surface discharge elements 21, 22 are located so that one surface carrying the discharge electrode 41 confronts the other surface carrying the discharge electrode 42. As shown in FIG. 3, the discharge electrodes 41, 42 and the inducing electrodes 51, 52 are connected to AC supplies 61, 62. When an AC surface discharge element is used to cause a surface discharge, a discharge electrode is generally grounded, whereas the discharge electrodes 41, 42 are connected to DC supplies 71, 72, respectively, in the present invention. Further, the DC supplies 71, 72 are connected to the inducing electrodes 51, 52 via the AC supplies 61, 62. The AC supplies 61, 62 generally comprise an AC generating portion and a transformer, and can be connected to the DC supplies 71, 72 through a terminal which is generally used as a grounding terminal for the secondary coil of the transformer.

As shown in FIG. 3, the dielectric article 11 to be treated is placed between a pair of the AC surface discharge elements 21, 22 while it is apart therefrom. When a high AC voltage is applied from the AC supplies 61, 62, ionization occurs from the discharge electrodes 41, 42 along the surfaces of the dielectric layers 31, 32 carrying the discharge electrodes 41, 42, and positive and negative ions are generated, i.e., the surface discharge occurs. If DC voltages V1 and V2 which have different potentials are applied from the DC supplies 71, 72 to the discharge electrodes 41, 42, at the same time, respectively, a DC field (herein after sometimes referred to as charging field) is formed between the AC surface discharge elements 21, 22, i.e., the discharge electrodes 41, 42. The DC voltages are also applied to the inducing electrodes 51, 52.

Figure 4:
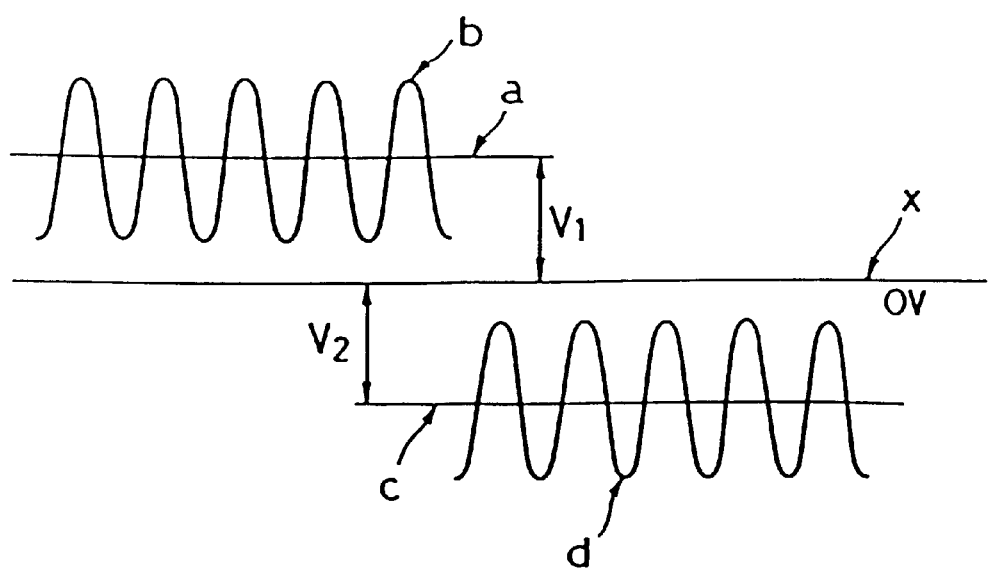
FIG. 4 is a graph showing an AC wave obtained by the apparatus of FIG. 3, when AC and DC voltages are applied.

FIG. 4 shows the AC waves generated in the AC surface discharge elements 21, 22, for example, when the positive voltage V1 is applied to the discharge electrode 41 of the AC surface discharge element 21, and the negative voltage V2 is applied to the discharge electrode 42 of the AC surface discharge element 22. DC positive potential V1 (line a in FIG. 4) with respect to the grounded potential (0V: line x in FIG. 4) is applied to the AC surface discharge element 21, and the amount of the DC component is added to the AC wave (curve b in FIG. 4) of the inducing electrode 51. The potential of the discharge electrode 41 becomes v1. DC negative potential V2 (line c in FIG. 4) with respect to the grounded potential (0V: line x in FIG. 4) is applied to the AC surface discharge element 22, and the amount of the DC component is added to the AC wave (curve d in FIG. 4) of the inducing electrodes 52. The potential of the discharge electrode 42 becomes V2.

The charging fields are formed between the AC surface discharge elements 21, 22, and the discharge electrodes 41, 42 serve as the ion-repulsive electrodes and the ion-attractive electrodes, respectively. For example, only the positive ions among the positive and negative ions generated on the surfaces of the dielectric layer of the AC surface discharge element 21 are selectively moved in a direction from the discharge electrode 41 as the first ion-repulsive electrode to the discharge electrode 42 as the first ion-attractive electrode, and transferred to the dielectric article 11 placed on the way to the discharge electrode 42. Thus, the dielectric article 11 is charged. On the other hand, only the negative ions among the positive and negative ions generated on the surfaces of the dielectric layer of the AC surface discharge element 22 are selectively moved in a direction from the discharge electrode 42 as the second ion-repulsive electrode to the discharge electrode 41 as the second ion-attractive electrode, and transferred to the dielectric article 11 placed on the way to the discharge electrode 41. Therefore, the dielectric article 11 is charged with the positive ions from one direction, and with the negative ions from the other direction, and highly hetero-charged, i.e., charged with both positive and negative ions. The charges on both sides of the dielectric article 11 form the field within the dielectric article 11, and the dielectric article 11 is polarized.

One of the DC voltages V1 and V2 may be the grounded potential, and the other may be a positive or negative potential, so long as they are different from each other. In this case, the discharge electrodes 41, 42 serve as the ion-repulsive electrodes and the ion-attractive electrodes with respect to the opposing discharge electrodes 42, 41, respectively. Thus, only one of the positive and negative ions among the positive and negative ions generated on the surfaces of the dielectric layers of the AC surface discharge elements 21, 22 are selectively moved, and transferred to the dielectric article 11 placed therebetween, and the dielectric article 11 is charged. It is possible to prevent the AC wave from directly entering the DC supplies and avoid shorts or the like, by incorporating a capacitor or the like into the DC supplies 71, 72.

The high-frequency AC voltages which may be applied from the AC supplies to cause the surface discharge are not limited, but preferably 0.2 KVp-p or more, more preferably 1 KVp-p or more. The term KVp-p means the voltage difference from the maximum peak to the minimum peak of the AC voltage. The upper limit of the AC voltage is not limited, so long as the dielectric layer of the AC surface discharge element is not damaged. The frequencies are not limited, but preferably 0.1 to 100 KHz, more preferably 1 to 50 KHz. If the voltage is less than 0.2 KVp-p, discharge does not substantially occur. If the frequencies are less than 0.1 KHz, extremely high voltage is required for the discharge. If the frequencies are more than 100 KHz, the dielectric layers may be overheated and thus damaged by dielectric superheating. The difference of the DC potentials applied to the discharge electrodes 41, 42 is not limited, so long as the desired charging occurs and dielectric breakdown does not occur, but preferably 0.5 KV or more, more preferably 1 KV or more. If the difference of the DC potentials is less than 0.5 KV, the amount of the charges is too small to obtain a satisfactory charging effect.

When the apparatus as shown in FIG. 3 is used to produce a piezoelectric electret article in accordance with the present invention, the DC voltage applied may vary with the thickness of the dielectric article to be treated, easiness of polarization, and/or the polarization temperature, and thus is not limited in general, but the ratio (V/t) of the DC voltage (V:KV) applied to the thickness (t:mm) of the dielectric article to be treated is preferably 5 KV/mm or more.

When a high charging voltage is applied to the discharge electrodes 41, 42, it is possible to broaden the distance between the electrodes, lower the electric intensity, and prevent the dielectric article to be treated from being damaged by spark discharge between the electrodes. If the distance between the electrodes is too broad to lower the electric intencity, however, the moving rate of the ions becomes slower, the amount of ions transferred to the article to be treated becomes smaller, and thus, the charging effectiveness is lowered.

Figure 5:
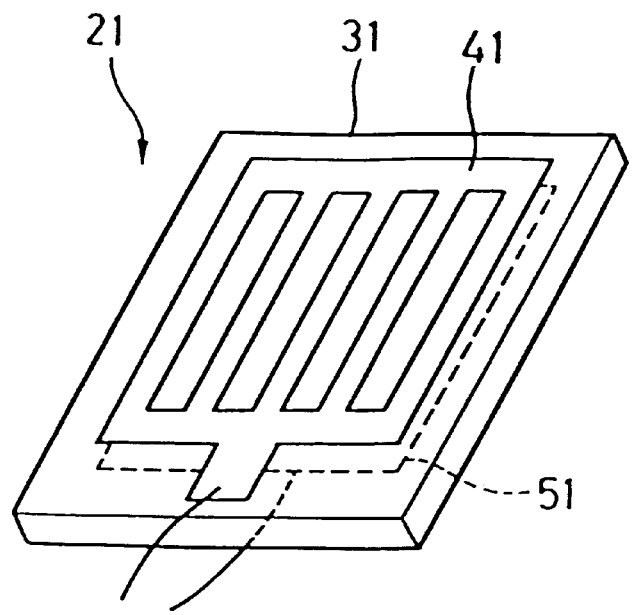
FIG. 5 is a perspective view of an AC surface discharge element which can be used in the present apparatus.

In the present invention, any known AC surface discharge elements may be used. For example, a glass, ceramic or plastic plate or sheet may be used as the dielectric layer. The thickness of the dielectric layer is not limited, but preferably 0.1 to 5 mm. If the layer is thicker, an extremely high voltage is required to occur discharge, and if the layer is thinner, the strength is lowered and the dielectric breakdown is liable to occur. As shown in FIG. 5, the discharge electrode 41 of the AC surface discharge element 21 is preferably a lattice or mesh electrode formed by applying an electrically conductive coating composition, a metal layer or an electrically conductive resin layer on a plastic film, or a lattice or mesh electrode made of a metal, such as aluminum or cupper.

The discharge electrode 41 preferably has one or more pores to expose the surface of the dielectric layer. The inducing electrode is not limited, but preferably a planar or net electrode formed by applying an electrically conductive coating composition, a metal layer or an electrically conductive resin layer on a plastic film, or a planar or net electrode made of a metal, such as aluminum or cupper. In the AC surface discharge element, the dielectric layer is preferably longer than the discharge and inducing electrodes so as to prevent a direct discharge from occurring therebetween at the edge of the element. When the dielectric layer does not have a sufficient length, the inducing electrode or the edge thereof is preferably insulated by covering with a dielectric material, such as a ceramic or polymer material. Further it is preferable to cover the discharge electrode with a dielectric membrane, such as a ceramic or polymer membrane so as to avoid the exhaustion of the discharge electrode by the surface discharge.

The means which may be used in the present invention for placing a dielectric article to be treated, apart from and between said ion-repulsive electrode and said ion-attractive electrode is not limited, so long as it can place the article in the charging space without substantially obstructing the function of ions to the article. When the article to be treated is a continuous material, such as a sheet, a pair of supports, such as rolls, may be installed at both sides of the charging space so that the sheet can pass through the space by the rolls. When the article to be treated is an independent material, such as a formed mask, a conveying means made of an insulating mesh material or the like may be provided between the above rolls so that the article on the conveying means can pass through the space by the rolls.

Figure 6:
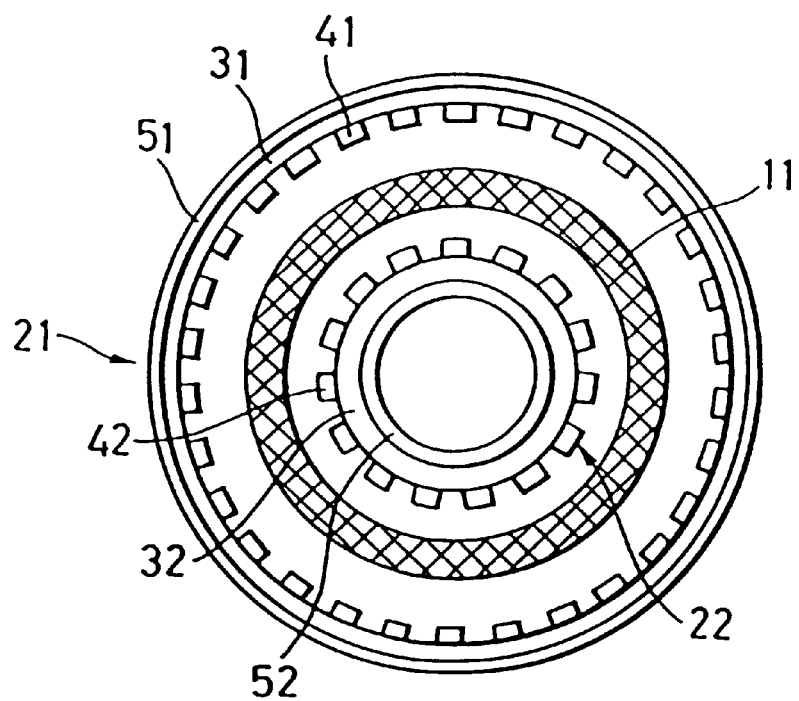
FIG. 6 is a sectional view schematically illustrating another embodiment of the present apparatus using a pair of cylindrical AC surface discharge elements.

In addition to the planar AC surface discharge element as shown in FIGS. 3 and 5, various types of the AC surface discharge elements may be used. For example, a pair of the AC surface discharge elements 21, 22, the cross-sectional shape of which is an arc, may be used to effectively charge the dielectric article having an arc cross-sectional shape. Further, a pair of the cylindrical AC surface discharge elements 21, 22 as shown in FIG. 6 may be used to effectively charge the cylindrical dielectric article. More particularly, the cylindrical AC surface discharge element 21 having a large diameter and the cylindrical AC surface discharge element 22 having a small diameter are concentrically placed while they are apart from each other. The AC surface discharge elements 21, 22 carry the discharge electrodes 41, 42 on one surface of the dielectric layers 31, 32, and the inducing electrodes 51, 52 on the other surface of the dielectric layers 31, 32. The elements 21, 22 are placed so that the surfaces carrying the discharge electrodes 41, 42 confront each other. The discharge electrodes 41, 42, and the inducing electrodes 51, 52 are connected to the AC supplies (not shown) as in FIG. 3, respectively. Further, the discharge electrodes 41, 42 are connected to the DC supplies (not shown), and the inducing electrodes 51, 52 are substantially connected to the DC supplies via the AC supplies. It should be understood that because the shape of the dielectric article to be polarized is not limited in the present invention, the AC surface discharge element other than the cylindrical element may be used to charge the cylindrical dielectric article.

Figure 7:
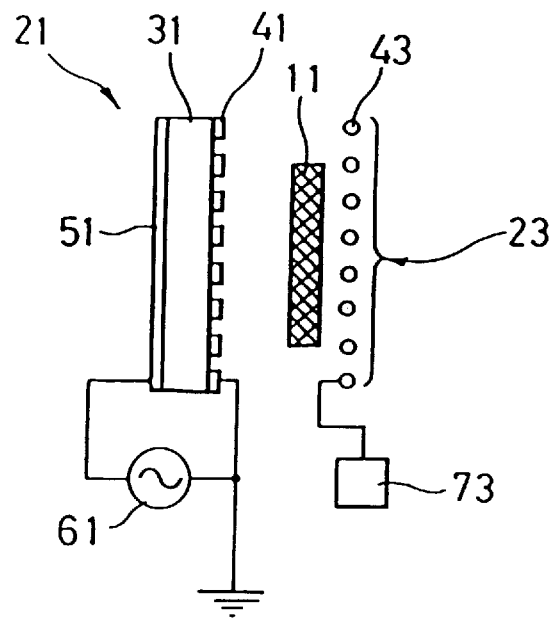
FIG. 7 is a sectional view schematically illustrating still another embodiment of the present apparatus using an AC surface discharge element and a DC corona discharge element.

The present invention can be carried out using a combination of the AC surface discharge element and the DC corona discharge element. A typical embodiment of the present invention wherein the AC surface discharge element is used as the first ion generating means and the DC corona discharge element is used as the second ion generating means is shown in FIG. 7. The DC corona discharge element which may be used in the present invention is not limited so long as it can cause DC corona discharge against the dielectric article to be treated. For example, the element having the discharge electrode such as a needle electrode may be used.

In this embodiment, the AC surface discharge element 21 and the DC corona discharge element 23 are located opposingly to each other, and apart from each other. The AC surface discharge element 21 carries the discharge electrode 41 on one side of the dielectric layer 31, and the inducing electrode 51 on the other side of the dielectric layer 31. The AC surface discharge element 21 is located so that the surface carrying the discharge electrode 41 confronts the DC corona discharge element 23. As in the apparatus shown in FIG. 3, the discharge electrode 41 and the inducing electrode 51 are connected to the AC supply 61. Further, the discharge electrode 41 is grounded as in the general AC surface discharge.

The DC corona discharge element 23 contains at least one discharge electrode 43, preferably plural discharge electrodes (seven electrodes in the embodiment as shown in FIG. 7) connected to the DC supply 73. The discharge electrode which may be used in the DC corona discharge element is not limited. Wire electrodes are used in the embodiment as shown in FIG. 7.

As another embodiment, the DC corona discharge element 23 may be grounded, and the DC voltage may be applied to the discharge electrode 41 of the AC surface discharge element 21.

As shown in FIG. 7, the dielectric article 11 to be treated is placed between the AC surface discharge element 21 and the DC corona discharge element 23 while it is apart therefrom. When a high AC voltage is applied from the AC supply 61, the positive and negative ions are generated on the surface of the dielectric layer carrying the discharge electrode, i.e., the surface discharge occurs. If a high DC voltage is applied from the DC supply 73 to the discharge electrode 43, at the same time, a DC field (a charging field) is formed between the AC surface discharge element 21 and the DC corona discharge element 23, i.e. between the discharge electrode 41 of the former and the discharge electrode 43 of the latter. In the charging field, the discharge electrode 41 of the AC surface discharge element 21 serves as the ion-repulsive electrode, and the discharge electrode 43 of the DC corona discharge element 23 serves as the ion-attractive electrode. Among the positive and negative ions generated on the surfaces of the dielectric layer of the AC surface discharge element 21, only the ions having the polarity opposite to that applied to the discharge electrode 43 are selectively drawn by and moved to the discharge electrode 43 of the DC corona discharge element 23, and transferred to the dielectric article 11 placed on the way to the discharge electrode 43. Thus, the dielectric article 11 is charged. As the charging of the dielectric article 11 proceeds, the DC corona discharge occurs from the discharge electrode 43 of the DC corona discharge element 23 to the dielectric article 11 which is being charged. The ions having the polarity opposite to that of ions transferred from the AC surface discharge element 21 are transferred to the dielectric article 11 which is being charged. Therefore, the dielectric article 11 is charged with the positive ions from one direction, and with the negative ions from the other direction, and highly hetero-charged. The charges on both sides of the dielectric article 11 form the field within the dielectric article 11, and the dielectric article 11 is polarized. It is desirable to place the dielectric article 11 nearer to the DC corona discharge element 23 than the AC surface discharge element 21 so that the lowest possible voltage can be applied to cause the DC discharge from the DC corona discharge element 23.

The AC voltage with high frequencies, and the frequencies as above may be used to cause the AC surface discharge in this embodiment. The DC voltage which may be applied to the DC corona discharge element 23 is not limited. Because the amount of charges greatly depends on the distance between the dielectric article and the DC corona discharge element, it is desirable to apply the DC voltage so that the electric intencity becomes preferably 1 to 15 KV/cm, more preferably 3 to 10 KV/cm. If the electric intencity is less than 1 KV/cm, the discharge hardly occur, and if the electric intencity is more than 15 KV/cm, spark discharge by dielectric breakdown of the air may occur. The above conditions may vary with the shapes of the electrodes or the materials of the dielectric articles to be treated, and thus the above numerical figures may be larger or smaller.

Figure 8:
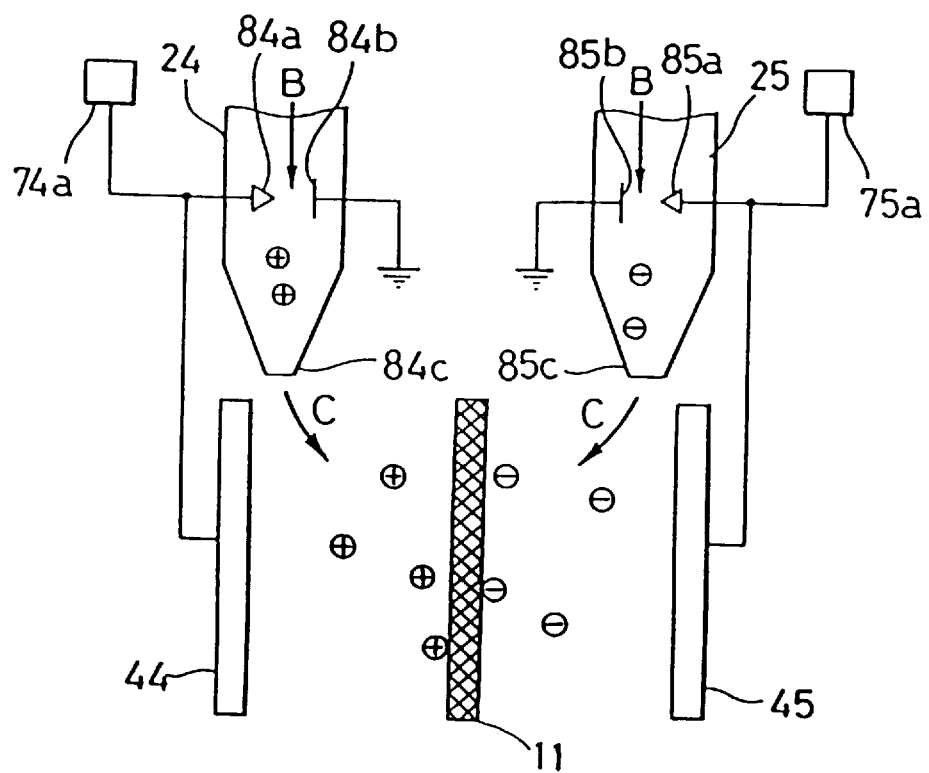
FIG. 8 is a sectional view schematically illustrating still another embodiment of the present apparatus using a pair of ionizers.

A pair of the ionizer elements may be used as the first and second ion generating means, respectively, in the present invention. A typical embodiment thereof is shown in FIG. 8.

In this embodiment, two ionizer elements 24, 25 are located while being apart from each other. The ionizer elements 24, 25 comprise the DC corona discharge electrodes 84a, 85a, such as a wire or needle electrode, the grounded electrodes 84b, 85b, and the guiding plates 84c, 85c for sending the generated ions to the charging space. The discharge electrodes 84a, 85a are connected to the high DC voltage supplies 74a, 75a, respectively. The polarities of the supplies are opposite to each other. The grounded electrodes 84b, 85b are connected to the earth, respectively. The ionizer elements 24, 25 generate the positive and negative ions by applying a high DC voltage and ionizing a reactive gas, such as air, supplied from the direction B. The generated ions are released to the direction C by the guiding plates 84c, 85c. The ion-movable electrodes 44, 45 are connected to the DC supplies 74a, 75a, and have the polarities same as those of the discharge electrodes 84a, 85a, respectively. The ion-movable electrode 44 serves as the ion-repulsive electrode for the ions released from the guiding plate 84c, and as the ion-attractive electrode for the ions released from the guiding plate 85c. On the other hand, the ion-movable electrode 45 serves as the ion-attractive electrode for the ions released from the guiding plate 84c, and as the ion-repulsive electrode for the ions released from the guiding plate 85c. Therefore, the positive ions released from the ionizer element 24 is moved to a direction from the ion-movable electrode 44 to the electrode 45, and transferred to the dielectric article 11 placed on the way to the electrode 45. Thus, the dielectric article 11 is charged. On the other hand, the negative ions released from the ionizer element 25 is moved to a direction from the ion-movable electrode 45 to the electrode 44, and transferred to the dielectric article 11 placed on the way to the electrode 44. Thus, the dielectric article 11 is charged. Therefore, the dielectric article 11 is charged with the positive ions from one direction, and with the negative ions from the other direction, and highly hetero-charged. The charges on both sides of the dielectric article 11 form the field within the dielectric article 11, and the dielectric article 11 is polarized.

Figure 9:
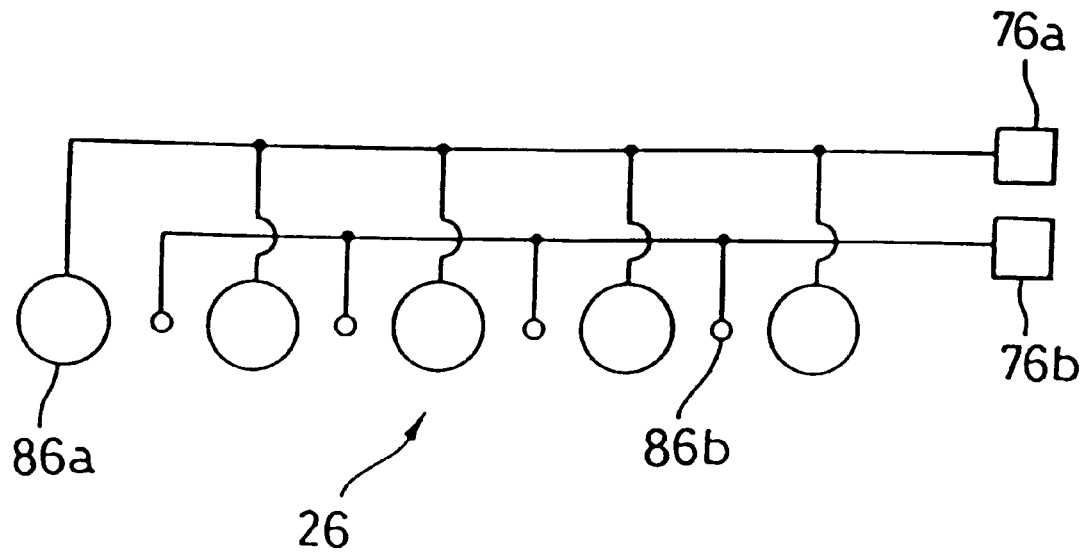
FIG. 9 is a sectional view schematically illustrating still another embodiment of the present apparatus using a pair of DC corona-type ion generating elements.
Figure 9:
Figure 9:
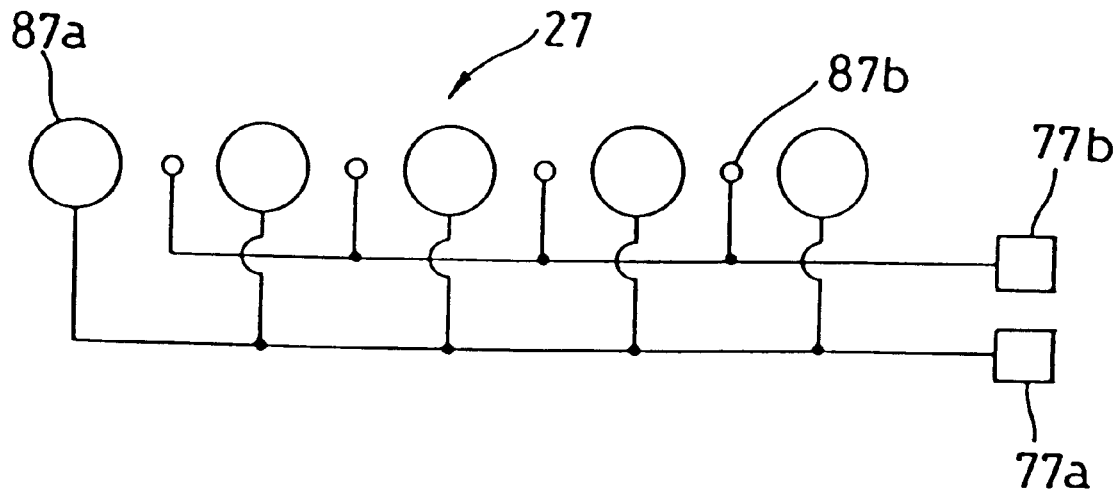

A pair of the DC corona-type ion generating elements may be used as the first and second ion generating means, respectively, in the present invention. A typical embodiment thereof is shown in FIG. 9.

In this embodiment, two DC corona-type ion generating elements 26, 27 are located oppositely to each other and apart from each other. The DC corona-type ion generating elements 26, 27 comprise the counter electrodes 86a, 87a, and the discharge electrodes 86b, 87b. The counter electrodes 86a, 87a are connected to the DC supplies 76a, 77a, respectively. The polarities of the supplies 76a, 77a are opposite to each other. The discharge electrodes 86b, 87b are connected to the DC supplies 76b, 77b, respectively. The polarities of the supplies 76b, 77b are opposite to each other. Although the DC corona-type ion generating elements 26, 27 as shown in FIG. 9 contains five counter electrodes 86a, 87a and four discharge electrodes 86b, 87b, respectively, the number of the electrodes may vary with the conditions and purposes. The types of the counter and discharge electrodes are not limited so long as they can cause the corona discharge. For example, a bar electrode may be used as the counter electrode, and a wire or needle electrode may be used as the discharge electrode.

In the DC corona-type ion generating element 26, DC voltages V11 and V12 which have same polarities, but have different potentials are applied to the counter electrode 86a and the discharge electrode 86b from the DC supplies 76a, 76b, respectively. When the potential difference of the voltages V11 and V12 is more than the electric intencity required to cause the corona discharge, and the absolute value of the voltage V12 is higher than that of the voltage V11, ions having the polarity same as that of the voltage applied from the DC supplies 76a, 76b are generated between the counter electrode 86a and the discharge electrode 86b. In this case, when the voltages V11, V12 are, for example, negative, the negative ions are generated between the counter electrode 86a and the discharge electrode 86b of the DC corona-type ion generating element 26.

On the other hand, in the DC corona-type ion generating element 27, DC voltages V13 and V14 which have polarities opposite to those of the voltages applied by the above DC supplies 76a, 76b, and have different potentials are applied to the counter electrode 87a and the discharge electrode 87b from the DC supplies 77a, 77b, respectively. When the potential difference of the voltages V13 and V14 is more than the electric intencity required to cause the corona discharge, and the absolute value of the voltage V14 is higher than that of the voltage V13, ions having the polarity opposite to that of the ions generated between the counter electrode 86a and the discharge electrode 86b of the above DC corona-type ion generating element 26 are generated between the counter electrode 87a and the discharge electrode 87b. In this case, when the voltages V13, V14 are, for example, positive, the positive ions are generated between the counter electrode 87a and the discharge electrode 87b of the DC corona-type ion generating element 27.

At the same time, a DC field (charging field) is formed between the DC corona-type ion generating elements 26, 27, and thus, the combination of the counter electrode 86a and the discharge electrode 86b, and the combination of the counter electrode 87a and the discharge electrode 87b serve as the ion-repulsive electrodes, and the ion-attractive electrodes, respectively. When, for example, the above voltages V11 to V14 are applied, the negative ions generated in the DC corona-type ion generating element 26 are moved from the combination of the counter electrode 86a and the discharge electrode 86b serving as the ion-repulsive electrode, to the combination of the counter electrode 87a and the discharge electrode 87b serving as the ion-attractive electrode, and transferred to the dielectric article 11 placed in the way to the latter combination. The dielectric article 11 is charged. On the other hand, the positive ions generated in the DC corona-type ion generating element 27 are moved from the combination of the counter electrode 87a and the discharge electrode 87b serving as the ion-repulsive electrode, to the combination of the counter electrode 86a and the discharge electrode 86b serving as the ion-attractive electrode, and transferred to the dielectric article 11 placed in the way to the latter combination. The dielectric article 11 is charged. Thus, the dielectric article 11 is highly hetero-charged, and polarized.

The distance between the counter and discharge electrodes which can cause the DC corona discharge is preferably about 1 mm to 20 mm, and the potential difference therebetween depends on the shapes of or distances between the electrodes, but is preferably about 0.1 KV to 20 KV. The potential difference between the DC corona-type ion generating elements 26, 27 is not limited, but preferably 1 KV or more. If the potential difference is less than 1 KV, the amount of the charges is too small to obtain a satisfactory charging effect. The upper limit of the potential difference is not limited, so long as the dielectric breakdown does not occur.

A bipolar DC corona-type ion generating element wherein the corona discharge occurs at both of the counter and discharge electrodes may be also used in the present invention. However, a high charging effectiveness can be obtained from the above-mentioned DC corona-type ion generating element which produces ions having a single polarity.

Figure 10:
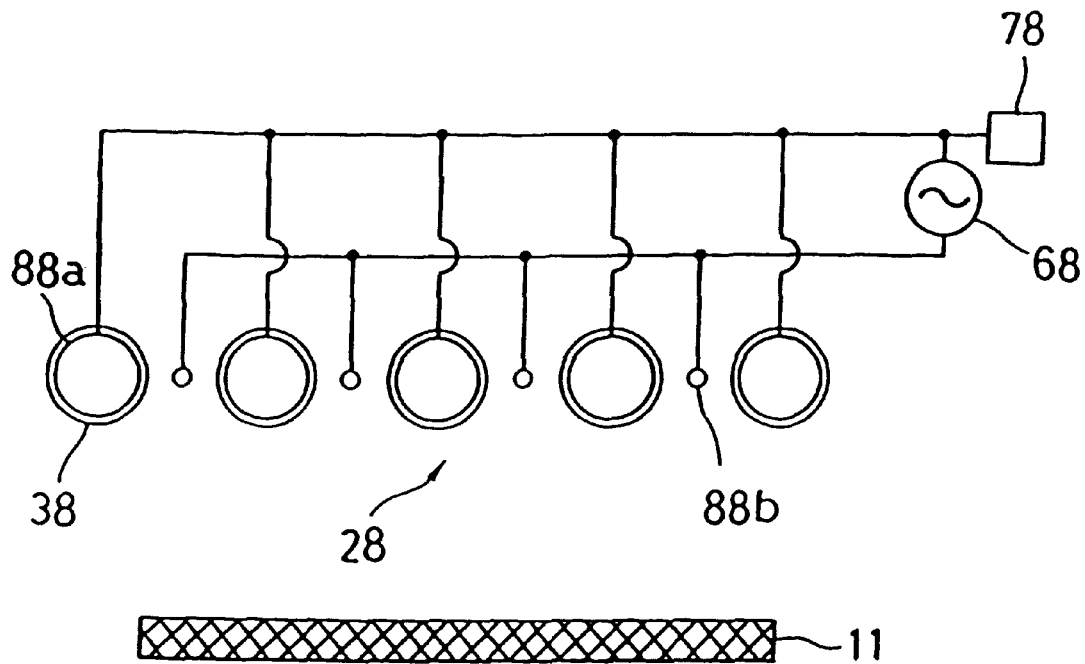
FIG. 10 is a sectional view schematically illustrating still another embodiment of the present apparatus using a pair of AC corona-type ion generating elements.
Figure 10:
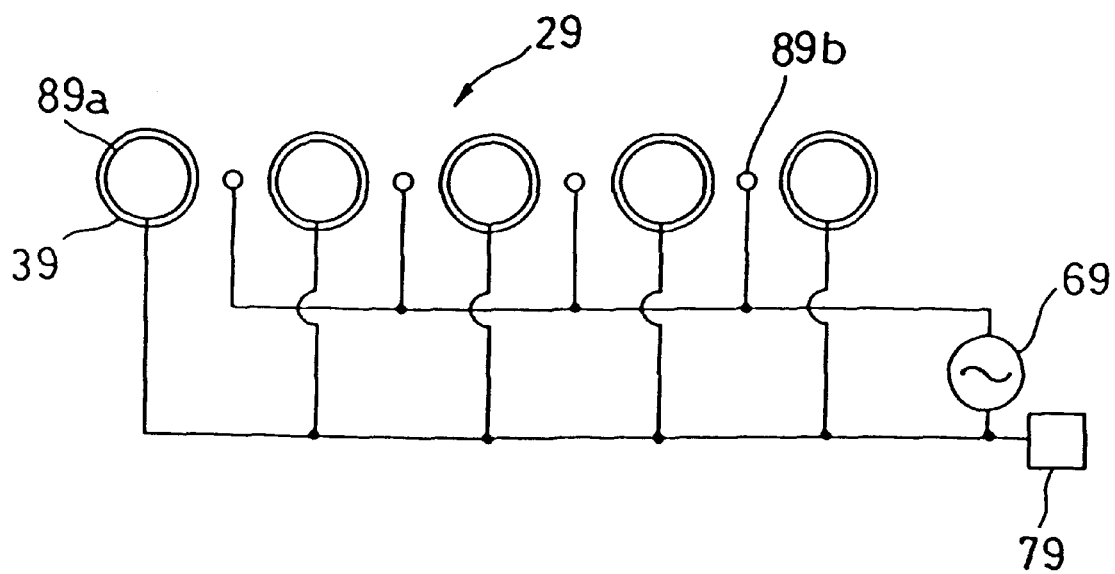

A pair of the AC corona-type ion generating elements may be used as the first and second ion generating means, respectively, in the present invention. A typical embodiment thereof is shown in FIG. 10.

In this embodiment, two AC corona-type ion generating elements 28, 29 are located oppositely to each other and apart from each other. The AC corona-type ion generating elements 28, 29 comprise the inducing electrodes 88a, 89a, and the discharge electrodes 88b, 89b. The inducing electrodes 88a, 89a and the discharge electrodes 88b, 89b are connected to the AC supplies 68, 69, respectively. In this embodiment, the inducing electrodes 88a, 89a are connected to the DC supplies 78, 79, and the DC supplies 78, 79 are connected to the AC supplies 68, 69. The AC supplies 68, 69 generally comprise an AC generating portion and a transformer, and can be connected to the DC supplies 78, 79 through a terminal which is generally used as a grounding terminal for the secondary coil of the transformer of the transformer. Although the AC corona-type ion generating elements 28, 29 as shown in FIG. 10 contains five inducing electrodes 88a, 89a and four discharge electrodes 88b, 89b, respectively, the number of the electrodes may vary with the conditions and purposes. It is preferable to cover the inducing electrodes 88a, 89a with dielectric layers 38, 39, such as glass, ceramic or plastic layers, as shown in FIG. 10. It is because a spark discharge is avoided and a stable corona discharge can be caused.

The dielectric article 11 to be treated is placed between a pair of the AC corona-type ion generating elements 28, 29, while it is apart from the elements. When a high AC voltages are applied from the AC supplies 68, 69, the positive and negative ions are generated between the inducing electrodes 88a, 89a and the discharge electrodes 88b, 89b. If DC voltages V21 and V22 which have different potentials are applied from the DC supplies 78, 79 at the same time, respectively, a DC field (charging field) is formed between the AC corona-type ion generating elements 28, 29, as explained for the AC surface discharge element. When the charging field is formed between the elements 28, 29, the inducing electrodes 88a, 89a and the discharge electrodes 88b, 89b serve as the ion-repulsive and ion-attractive electrodes, respectively. For example, the positive voltage V22 is applied to the DC supply 79, only the negative ions among the positive and negative ions generated in the AC corona-type ion generating element 28 are moved from the inducing electrode 88a and the discharge electrode 88b serving as the ion-repulsive electrode, to the inducing electrode 89a and the discharge electrode 89b serving as the ion-attractive electrode, and transferred to the dielectric article 11 placed in the way to the latter. Thus, the dielectric article 11 is charged. On the other hand, only the positive ions among the positive and negative ions generated in the AC corona-type ion generating element 29 are moved from the inducing electrode 89a and the discharge electrode 89b serving as the ion-repulsive electrode, to the inducing electrode 88a and the discharge electrode 88b serving as the ion-attractive electrode, and transferred to the dielectric article 11 placed in the way to the latter. Thus, the dielectric article 11 is charged. Therefore, the dielectric article 11 is hetero-charged, and polarized.

The high-frequency AC voltages which may be applied from the AC supplies to cause the AC corona discharge are not limited, but preferably about 0.1 KVp-p to 50 KVp-p. The frequencies are not limited, but preferably 0.1 to 100 KHz. If the voltage is less than 0.1 KVp-p, discharge does not substantially occur. If the frequencies are less than 0.1 KHz, an extremely high voltage is required for the discharge. If the frequencies are more than 100 KHz, the dielectric layers may be overheated and thus damaged by dielectric superheating. The distance between the inducing and discharge electrodes which can cause the AC corona discharge is preferably about 0.1 mm to 10 mm. The potential difference between the AC corona-type ion generating elements 28, 29, i.e., the difference (V22–V21) of the voltages applied to the DC supplies 78, 79 is not limited, so long as the dielectric breakdown does not occur, but preferably 0.5 KV or more, more preferably 1 KV or more. If the potential difference is less than 0.5 KV, the amount of the substantial charges is too small to obtain a satisfactory charging effect.

In addition to the combinations as shown in FIGS. 3, and 7 to 10, the combinations of the AC surface discharge element and the ionizer element, the AC surface discharge element and the DC corona-type ion generating element, the AC surface discharge element and the AC corona-type ion generating element, the ionizer element and the DC corona discharge element, the ionizer element and the DC corona-type ion generating element, the ionizer element and the AC corona-type ion generating element, the DC corona-type ion generating element and the AC corona-type ion generating element, the DC corona-type ion generating element and the DC corona discharge element, the AC corona-type ion generating element and the DC corona discharge element may be used in the present invention. It is noted that the embodiment wherein the DC corona discharge elements are used as the first and second ion generating means is not included in the present invention. It is because, as mentioned above, a high voltage must be applied between electrodes in a charging treatment using a DC corona discharge element, a higher voltage may cause spark discharge or dielectric breakdown, and thus a dielectric article to be treated may be damaged. Further, when a piezoelectric electret article is produced, the article to be treated is polarized with the electric field formed by the surface charges on the article to be treated. It is difficult to apply the charges necessary to form the electric field enough to polarize the article by the charging treatment using a DC corona discharge element.

In the present invention, the article to be treated may be heated during the step of moving the positive and/or negative ions from the ion generating means to the article. It is preferable to maintain the article at room temperature up to the melting point thereof. When the piezoelectric or pyroelectric electret article is produced, it is preferable to maintain the ferroelectric article to be treated at room temperature up to Curie temperature thereof during the above moving step. The heating means which may be used in the present invention is not limited, and any conventional heating means, for example, a heater such as an oven or an electric heater, or infrared radiation may be used.

During the above moving step, the temperature of the article to be treated may be appropriately selected, in view of, for example, the kinds of the article to be treated, charging conditions, polarization conditions for the desired electret article, and so on. For example, when the piezoelectric or pyroelectric electret article having a high polarization effectiveness is produced, it is preferable to use the highest possible temperature below Curie temperature of the article. In this case, if the temperature of the article to be treated is maintained below Curie temperature thereof at the exit of the station wherein the moving step is carried out, the temperature of the article may be higher than Curie temperature in the middle of the station for the moving step.

Figure 11:
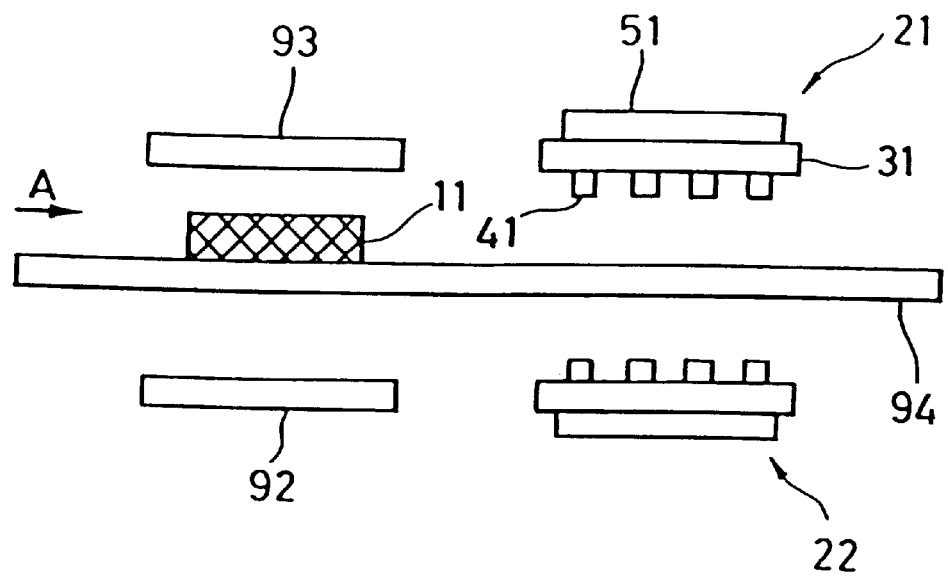
FIG. 11 schematically illustrates still another embodiment of the present apparatus using a heating means.

The heating means may be located so that the charging space overlaps with the heating space, or the former is separated from the latter. The heating treatment can be carried out before or during the ion-moving step. For example, the embodiment of the present invention wherein the heating treatment is carried out separately before the ion-moving step is shown in FIG. 11. A pair of the heating means, such as the heaters 92, 93, are located in series with a pair of the ion generating means, such as the AC surface discharge elements 21, 22, and the conveying means 94 which is made of an insulating mesh material or the like and can convey the dielectric article 11 in the direction A from the heating station to the charging station is installed between said pairs. The dielectric article 11 which is being conveyed on the conveying means 94 is first heated between the heaters 92, 93, and then charged between the AC surface discharge elements 21, 22. The dielectric article 11 may be heated during passing between the heaters 92, 93 to such a temperature that the dielectric article 11 becomes to the desired temperature during passing between the AC surface discharge elements 21, 22. In general, the dielectric article at a high temperature can easily be polarized. Therefore, it is possible to enhance the polarization effectiveness of the final electret article by heating the dielectric article to be treated.

If the dielectric article 11 is conveyed between the AC surface discharge elements 21, 22 so slowly that the temperature of the article is lowered by heat radiation, the dielectric article 11 is cooled as it is polarized. In general, the polarization state can be efficiently stabilized and the polarization effectiveness can be further improved, by carrying out the ion moving step at a high temperature and then the charging step while cooling.

In the present invention, it is not necessary to bring the dielectric article to be treated into contact with the ion generating means, the ion-repulsive electrodes and the ion-attractive electrodes, and thus, the dielectric article may substantially have any shapes. Further, the dielectric article can be charged only by placing or passing between pairs of the ion generating means, the ion-repulsive electrodes and the ion-attractive electrodes, the temperature control, such as heating or cooling can be easily carried out, and no troublesome procedures are required. Therefore, the present invention is suitable to a continuous process. Furthermore, the amount of the charges can be increased only by raising the charging voltages.

In the embodiment of the present invention wherein the AC surface discharge element, the ionizer element, the DC corona-type ion generating element and/or the AC corona-type ion generating element are used, the discharge voltage may be applied to the ion generating means independent of the charging voltage applied to the ion-repulsive and ion-attractive electrodes to transfer the ions to the dielectric article. Therefore, the final amount of the charges does not depend on the distance between the ion generating elements, but depends only on the potential difference of the voltages applied to the ion-repulsive and ion-attractive electrodes. Therefore, the shapes of the dielectric article which may be treated in the present invention are not limited. When a thick fibrous sheet, such as a felt, is treated by the conventional process wherein only the DC corona is applied, the back discharge does not occur sufficiently to pour the opposite-polarity charges, and thus, the amount of the charges is low. On the contrary, in the present invention, the dielectric article is treated with the positive and negative ions from both sides to effectively carry out the charging without the back discharge. In the present invention, the electric intensity between the ion-repulsive and ion-attractive electrodes may be lowered, or the distance between the electrodes can be broadened when a very high charging voltage is applied. Therefore, the possibility of the damage of the article by spark discharge, dielectric breakdown or the like is extremely reduced. Even if dielectric breakdown occurs at a part of the dielectric article during the charging step, the amount of the charges poured thereto from the adjacent portions is not too large to considerably damage the article. Because the polarization is caused by the transferred charges in the present invention, the charging treatment can be continued after dielectric breakdown, and the article having a large surface can be polarized.

An electret film for use in a microphone or the like was produced in the conventional process, for example, by forming a film, and carrying out the electret treatment of the film with the DC corona discharge, while the film is brough into intimate contact with the grounded electrode.

Figure 12:
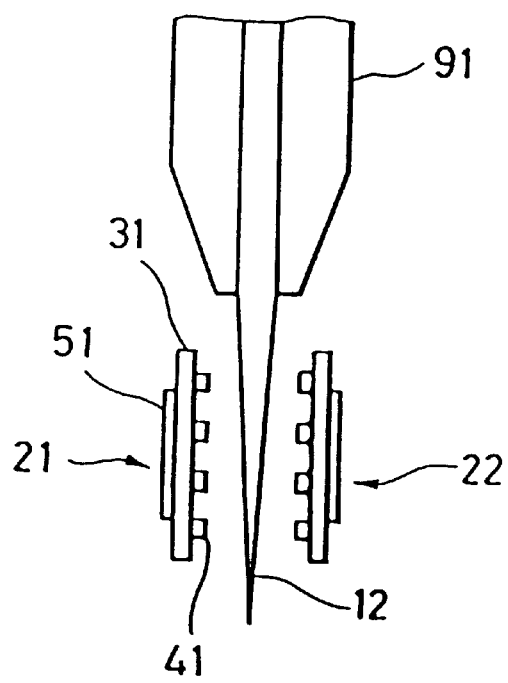
FIG. 12 schematically illustrates still another embodiment of the present apparatus applied to a T-die extrusion molding.

On the contrary, it is not necessary to contact the dielectric article with the ion generating means or the electrodes in the present invention, and the film can be charged while being prepared. For example, as shown in FIG. 12, the resin 12 in a melted state can be charged by, for example, the AC surface discharge elements 21, 22, immediately after injected from the T-die or inflation die 91. Further, the film can be charged during a drawing treatment. The film is preferably heated during the charging step to stabilize the charges.

The shape of the film is not limited, and the corrugated film or the like can be treated.

The electret article obtained according to the present invention may be used as a filter, a mask, or a dust-proof close; in a microphone; as a sensor in a dosimeter; or in a medical field as a poultice for treating rheumatism.

The piezoelectric or pyroelectric electret article obtained according to the present invention may be used in a sonic wave generating apparatus, a sonic wave detecting apparatus, a wave filter, a high voltage generator, or the like. More specifically, the a piezoelectric or pyroelectric electret article may be used as piezoelectric buzzer, an ignition element, an acceleration sensor, a speaker, a ultrasonic reflectscope tentacle, a ultrasonic diagnostic equipment, a blood pressure monitor, a blood flow meter, a hydrophone, or a surface elasticity wave (SAW) filter, or the like.

EXAMPLES

The present invention will now be further illustrated by, but is by no means limited to, the following Examples.

Example 1

The melt-blown polypropylene nonwoven fabric (weight per unit area=45 g/m$^2$; thickness=0.7 mm) was used as a sample.

The apparatus as shown in FIG. 3 was used, and the distance between the electrodes of the AC surface discharge elements was 40 mm. The above sample was placed between the AC surface discharge elements 21, 22. Then, the surface discharge was caused by applying the AC (voltage=6 KVp-p; frequency=23 KHz), and the potential difference between the discharge electrodes was set to 10 KV. The sample was charged for 1 minute.

The resulting electret melt-blown nonwoven fabric was evaluated for an initial pressure loss and a collection efficiency of the dusts of 0.3 to 0.5 μm in air, by passing air through the resulting electret fabric at a face velocity of 5 cm/sec. The dust collection efficiency was determined by counting the numbers of the dusts of 0.3 to 0.5 μm before and after the electret fabric by a particle counter.

The initial pressure loss was 1.1 to 1.5 mmaq and the dust collection efficiency was 90 to 95%.

Comparative Example 1

Discharge electrodes comprising 20 wires (diameter=30 μm; length=250 mm) and a grounded cupper planar electrode were placed. The discharge electrodes and the grounded electrode were apart from each other in a distance of 20 mm. The sample same as in Example 1 was charged for 1 minute between the discharge electrodes and the grounded electrode, by applying the voltage of 16 KV.

The initial pressure loss of the resulting electret melt-blown nonwoven fabric was 1.1 to 1.5 mmaq and the dust collection efficiency was 50 to 60%. It is apparent that the dust collection efficiency was low and the electret effect was insufficient, even if the distance of the electrodes was shorter and the voltage applied was higher than those in Example 1.

Example 2

The procedures described in Example 1 were repeated, except that the distance of the opposing AC surface discharge elements was 120 mm to obtain an electret melt-blown nonwoven fabric.

The initial pressure loss of the resulting electret melt-blown nonwoven fabric was 1.1 to 1.5 mmaq and the dust collection efficiency was 90 to 95%. It is apparent that the electret treatment can be effected as in Example 1, if the distance of the electrodes is wider.

Example 3

The apparatus as shown in FIG. 7 was used. The AC surface discharge element 21 was placed in a distance of 40 mm from the corona discharge electrodes 43 comprising 20 wires (diameter=30 μm; length=250 mm).

The sample as in Example 1 was placed between the AC surface discharge element 21 and the discharge electrodes 43. The distance between the sample and the discharge electrodes 43 was 5 mm. Then, the surface discharge was caused by applying the AC (voltage=6 KVp-p; frequency=23 KHz), and the potential difference between the discharge electrodes 43 and the AC surface discharge element 21 was set to 10 KV. The sample was charged for 1 minute.

The initial pressure loss of the resulting electret melt-blown nonwoven fabric was 1.2 to 1.6 mmaq and the dust collection efficiency was 90 to 95%.

Example 4

A hydro-entangled nonwoven fabric (weight per unit area=120 g/m$^2$) composed of 85% by weight of polypropylene fiber and 15% by weight of polyethylene/polypropylene composite fiber, a melt-blown nonwoven fabric (weight per unit area=80 g/m$^2$) composed of polypropylene, and a needle-punched nonwoven fabric (weight per unit area=120 g/m$^2$) composed of 40% by weight of polypropylene fiber and 60% by weight of polyethylene/polypropylene composite fiber were laminated and formed to a bowl shape corresponding to a human face profile to obtain a mask as a sample.

The apparatus as shown in FIG. 3 was used, and the distance between the electrodes of the AC surface discharge elements 21, 22 was 120 mm. The above sample was placed between the AC surface discharge elements 21, 22. Then, the surface discharge was caused by applying the AC (voltage=6 KVp-p; frequency=23 KHz), and the potential difference between the discharge electrodes was set to 15 KV. The sample was charged for 1 minute.

The resulting electret mask was evaluated for an initial pressure loss and a dust collection efficiency, by passing air containing silica particles (average particle size=0.45 μm) at 30 mg/m$^3$ through the resulting electret mask at a face velocity of 8 cm/sec. The dust collection efficiency was determined by measuring the concentration of the particles before and after the electret mask by a light scattering method concentration meter.

The initial pressure loss was 3.3 to 3.8 mmaq and the dust collection efficiency was 99.88 to 99.97%.

Comparative Example 2

The apparatus same as that used in Comparative Example 1 was used, excepted that the distance between the discharge electrodes and the grounded electrode was 60 mm. The mask sample as in Example 4 was placed between the discharge electrodes and the grounded electrode, and charged for 1 minute by applying the voltage of 30 KV.

The initial pressure loss of the resulting electret mask was 3.3 to 3.8 mmaq and the dust collection efficiency was 80 to 90%. It is apparent that the dust collection efficiency was low and the electret effect was insufficient, even if the distance of the electrodes was shorter and the voltage applied was higher than those in Example 4. The dust collection efficiency of the sample mask without the charging treatment was 75 to 85%.

Example 5

The needle-punched nonwoven fabric (weight per unit area=240 g/m$^2$; thickness=1.5 mm) composed of 80% by weight of polypropylene fiber and 20% by weight of rayon fiber was used as a sample.

The apparatus as shown in FIG. 3 was used, and the distance between the electrodes of the surface discharge elements 21, 22 was 120 mm. The above sample was placed between the AC surface discharge elements 21, 22. Then, the surface discharge was caused by applying the AC (voltage=6 KVp-p; frequency=23 KHz), and the potential difference between the discharge electrodes was set to 15 KV. The sample was charged for 1 minute.

The resulting electret needle-punched nonwoven fabric was evaluated for an initial pressure loss and a collection efficiency of the dusts of 0.3 to 0.5 μm in air, by passing air through the resulting electret fabric at a face velocity of 5 cm/sec. The dust collection efficiency was determined by counting the numbers of the dusts of 0.3 to 0.5 μm before and after the electret fabric by a particle counter.

The initial pressure loss was 1.0 to 1.3 mmaq and the dust collection efficiency was 90 to 96%.

Comparative Example 3

The apparatus same as that used in Comparative Example 1 was used, except that the distance between the discharge electrodes and the grounded electrode was 20 mm. The needle-punched nonwoven fabric sample as in Example 5 was placed between the discharge electrodes and the grounded electrode while the sample was contacted with the grounded electrode, and charged for 1 minute by applying the voltage of 16 KV.

The initial pressure loss of the resulting electret fabric was 1.0 to 1.3 mmaq and the dust collection efficiency was 60 to 70%. It is apparent that the dust collection efficiency was low and the electret effect was insufficient, even if the distance of the electrodes was shorter.

Example 6

The polytetrafluoroethylene (PTFE) film (thickness=50 μm) was used as a sample.

The apparatus as shown in FIG. 3 was used, and the distance between the electrodes of the AC surface discharge elements 21, 22 was 40 mm. The above sample was placed between the surface discharge elements 21, 22. Then, the surface discharge was caused by applying the AC (voltage=6 KVp-p; frequency=23 KHz). At the same time, the voltage −1 KV, −2 KV or −5 KV was applied to the DC supply 71, and the DC supply 72 was grounded so that the potential difference between the discharge electrodes was −1 KV, −2 KV or −5 KV. The sample was charged for 1 minute.

Shortly after the charging was completed, the resulting electret film was placed on a cupper grounded plate, and the surface potential was measured by Treck surface potential meter Model 344. The results are shown in Table 1.

TABLE 1

| Voltages applied | −1 KV | −2 KV | −5 KV |
| --- | --- | --- | --- |
| Surface potential (front) | −800 to −900 | −1500 to −1800 | −4400 to 4700 |
| Surface potential (back) | +800 to +900 | +1500 to +1800 | +4400 to 4700 |

Comparative Example 4

The apparatus same as that used in Comparative Example 1 was used, except that the distance between the discharge electrodes and the grounded electrode was 20 mm. The PTFE film sample as in Example 6 was placed between the discharge electrodes and the grounded electrode, and charged for 1 minute by applying the voltage of −10 KV between the discharge electrodes and the grounded electrode. The surface charges were measured as in Example 6. The results are shown in Table 2.

TABLE 2

| Discharged surface | less than −100 V |
| --- | --- |
| Opposite surface | less than −50 V |

The amount of charges was very small and the charges were dispersed.

According to the present invention, the size and/or shape of the dielectric articles to be treated are not limited. Therefore, it is possible to efficiently treat the nonplanar or thick articles. Further, a high voltage can be applied, and the temperature of the dielectric article can be easily controlled, if necessary. The dielectric articles are hardly damaged by, for example, spark discharge or dielectric breakdown. The electret article having satisfactorily considerable and lasting charge can be obtained by applying each of opposite-polarity charges to each side of the article to be treated, at the same time.

A film can be charged immediately after extrusion from a T-die or inflation die, or during various treatments, such as a drawing treatment.

The amount charged by the process of the present invention does not depend on electric intensity between the ion-repulsive electrode and the ion-attractive electrode, but depends only on a potential difference therebetween. Therefore, the space between both electrodes, and thus the space for treating the dielectric article can be broadened. Further, it is possible to charge the article only by placing or passing between a pair of the ion generating means, the ion-repulsive electrodes and the ion-attractive electrodes without troublesome procedures, and thus the present invention is suitable for a continuous process. It is not necessary to use high electric intencity, and spark discharge does not occur between the electrodes. Thus, the article is not damaged.

Although the present invention has been described with reference to specific embodiments, various changes and modifications obvious to those skilled in the art are deemed to be within the sprit, scope, and concept of the invention.

What we claim is:

1. A process for an electret treatment of a dielectric article, comprising the steps:
   (1) placing said dielectric article between a combination of a first ion-repulsive electrode and a first ion-attractive electrode, between a combination of a second ion-repulsive electrode and a second ion-attractive electrode, and apart from each of said first and second ion-repulsive electrodes and said first and second ion-attractive electrodes, said first ion-repulsive electrode and said first ion-attractive electrode being opposed to each other, said second ion-repulsive electrode and said second ion-attractive electrode being opposed to each other, so that said first ion-repulsive electrode is located at a side opposite to said second ion-repulsive electrode with respect to said dielectric article, and said first ion-attractive electrode is located at a side opposite to said second ion-attractive electrode with respect to said dielectric article;

(2) supplying a first positive ion and a first negative ion from a first ion generating means between said dielectric article and said first ion-repulsive electrode, said first ion generating means being selected from the group consisting of an alternating current surface discharge element and an alternating current corona ion generating element;

(3) applying, independently of a discharge voltage applied to said first ion generation means, a direct current voltage between said first ion-repulsive electrode and said first ion-attractive electrode to produce a first potential difference therebetween, whereby only one of said first positive and negative ions is moved in a direction from said first ion-repulsive electrode to said first ion-attractive electrode due to said first potential difference, and is transferred on said dielectric article;

(4) supplying a second positive ion and a second negative ion from a second ion generating means between said dielectric article and a second ion-repulsive electrode, said second ion generating means being selected from the group consisting of an alternating current surface discharge element and an alternating current corona ion generating element; and (5) applying, independently of a discharge voltage applied to said first ion generation means, a direct current voltage between said second ion-repulsive electrode and said second ion-attractive electrode to produce a second potential difference therebetween, whereby only said second ion having an opposite-polarity to polarity of said first ion transferred on said dielectric article is moved in a direction from said second ion-repulsive electrode to said second ion-attractive electrode due to said second potential difference, and is transferred on said dielectric article.

2. The process according to claim 1, wherein said steps of moving one of said first positive and negative ions and moving said ion having opposite-polarity are carried out at a temperature from room temperature (inclusive) to Curie temperature (exclusive) of said dielectric article.

3. The process according to claim 2, wherein a piezoelectric article is manufactured.

4. The process according to claim 1, wherein said steps of moving one of said first positive and negative ions and moving said ion having opposite-polarity are carried out at a temperature from room temperature (inclusive) to a melting point (exclusive) of said dielectric article.

5. The process according to claim 1, wherein each of said first and second ion generating means is an alternating current surface discharge element; a discharge electrode of said alternating current surface discharge element as said first ion generating means serves as said ion-repulsive electrode for ions supplied from said first ion generating means and also serves as said ion-attractive electrode for ions supplied from said second ion generating means; and a discharge electrode of said alternating current surface discharge element as said second ion generating means serves as said ion-repulsive electrode for ions supplied from said second ion generating means and also serves as said ion-attractive electrode for ions supplied from said first ion generating means.

6. The process according to claim 1, wherein each of said first and second ion generating means is an alternating current corona ion generating element; an inducing electrode and a discharge electrode of one alternating current corona ion generating element serve as said first ion-repulsive electrode and also serve as said second ion-attractive electrode; and an inducing electrode and a discharge electrode of the other alternating current corona ion generating element serve as said first ion-attractive electrode and also serve as said second ion-repulsive electrode.

7. A process for an electret treatment of a dielectric article, comprising the steps;

(1) placing said dielectric article, between a combination of a first ion-repulsive electrode and a first ion-attractive electrode, between a combination of a second ion-repulsive electrode and a second ion-attractive electrode, and apart from each of said first and second ion-repulsive electrodes and said first and second ion-attractive electrodes, said first ion-repulsive electrode and said first ion-attractive electrode being opposed to each other, said second ion-repulsive electrode and said second ion-attractive electrode being opposed to each other, so that said first ion-repulsive electrode is located at a side opposite to said second ion-repulsive electrode with respect to said dielectric article, and said first ion-attractive electrode is located at a side opposite to said second ion-attractive electrode with respect to said dielectric article;

(2) supplying a first positive ion and a first negative ion from a first ion generating means between said dielectric article and said first ion-repulsive electrode, said first ion generating means being selected from the group consisting of an alternating current surface discharge element and an alternating current corona ion generating element;

(3) applying, independently of a discharge voltage applied to said first ion generating means, a direct current voltage between said first ion-repulsive electrode and said first ion-attractive electrode to produce a first potential difference therebetween, whereby only one of said first positive and negative ions is moved in a direction from said first ion-repulsive electrode to said first ion-attractive electrode due to said first potential difference, and is transferred on said dielectric article;

(4) supplying a second ion having an opposite-polarity to polarity of said first ion transferred on said dielectric article from a second ion generating means between said dielectric article and a second ion-repulsive electrode, said second ion generating means being selected from the group consisting of an ionizer and a direct current corona ion generating element; and (5) applying, independently of a discharge voltage applied to said first ion generating means, a direct current voltage between said second ion-repulsive electrode and said second ion-attractive electrode to produce a second potential difference therebetween, whereby said opposite-polarity second ion from said second ion generating means is moved in a direction from said second ion-repulsive electrode to said second ion-attractive electrode due to said second potential difference, and is transferred on said dielectric article.

8. The process according to claim 7, wherein said steps of moving one of said first positive and negative ions and moving said ion having opposite-polarity are carried out at a temperature from room temperature (inclusive) to Curie temperature (exclusive) of said dielectric article.

9. The process according to claim 8, wherein a piezoelectric article is manufactured.

10. The process according to claim 7, wherein said steps of moving one of said first positive and negative ions and moving said ion having opposite-polarity are carried out at a temperature from room temperature (inclusive) to a melting point (exclusive) of said dielectric article.

11. A process for an electret treatment of a dielectric article, comprising the steps:
(1) placing said dielectric article, between a combination of a first ion-repulsive electrode and a first ion-attractive electrode, between a combination of a second ion-repulsive electrode and a second ion-attractive electrode, and apart from each of said first and second ion-repulsive electrodes and said first and second ion-attractive electrodes, said first ion-repulsive electrode and said first ion-attractive electrode being opposed to each other, said second ion-repulsive electrode and said second ion-attractive electrode being opposed to each other, so that said first ion-repulsive electrode is located at a side opposite to said second ion-repulsive electrode with respect to said dielectric article, and said first ion-attractive electrode is located at a side opposite to said second ion-attractive electrode with respect to said dielectric article;
(2) supplying a first positive ion or a first negative ion from a first ion generating means between said dielectric article and said first ion-repulsive electrode, said first ion generating means being selected from the group consisting of an ionizer and a direct current corona ion generating element;
(3) applying, independently of a discharge voltage applied to said first ion generating means, a direct current voltage between said first ion-repulsive electrode and said first ion-attractive electrode to produce a first potential difference therebetween, whereby said first positive or negative ions is moved in a direction from said first ion-repulsive electrode to said first ion-attractive electrode due to said first potential difference, and is transferred on said dielectric article;
(4) supplying a second positive ion and a second negative ion from a second ion generating means between said dielectric article and a second ion-repulsive electrode, said second ion generating means being selected from the group consisting of an alternating current surface discharge element and an alternating current corona ion generating element; and
(5) applying, independently of a discharge voltage applied to said first ion generating means, a direct current voltage between said second ion-repulsive electrode and said second ion-attractive electrode to produce a second potential difference therebetween, whereby only said second ion having an opposite-polarity to polarity of said first ion transferred on said dielectric article is moved in a direction from said second ion-repulsive electrode to said second ion-attractive electrode due to said second potential difference, and is transferred on said dielectric article.

12. The process according to claim 11, wherein said steps of moving one of said first positive and negative ions and moving said ion having opposite-polarity are carried out at a temperature from room temperature (inclusive) to Curie temperature (exclusive) of said dielectric article.

13. The process according to claim 12, wherein a piezoelectric article is manufactured.

14. The process according to claim 11, wherein said steps of moving one of said first positive and negative ions and moving said ion having opposite-polarity are carried out at a temperature from room temperature (inclusive) to a melting point (exclusive) of said dielectric article.

15. A process for an electret treatment of a dielectric article, comprising the steps:
(1) placing said dielectric article, between a combination of a first ion-repulsive electrode and a first ion-attractive electrode, between a combination of a second ion-repulsive electrode and a second ion-attractive electrode, and apart from each of said first and second ion-repulsive electrodes and said first and second ion-attractive electrodes, said first ion-repulsive electrode and said first ion-attractive electrode being opposed to each other, said second ion-repulsive electrode and said second ion-attractive electrode being opposed to each other, so that said first ion-repulsive electrode is located at a side opposite to said second ion-repulsive electrode with respect to said dielectric article, and said first ion-attractive electrode is located at a side opposite to said second ion-attractive electrode with respect to said dielectric article;
(2) supplying a first positive ion or a first negative ion from a first ion generating means between said dielectric article and said first ion-repulsive electrode, said first ion generating means being selected from the group consisting of an ionizer and a direct current corona ion generating element;
(3) applying, independently of a discharge voltage applied to said first ion generating means, a direct current voltage between said first ion-repulsive electrode and said first ion-attractive electrode to produce a first potential difference therebetween, whereby said first positive or negative ions is moved in a direction from said first ion-repulsive electrode to said first ion-attractive electrode due to said first potential difference, and is transferred on said dielectric article;
(4) supplying a second ion having an opposite-polarity to polarity of said first ion transferred on said dielectric article from a second ion generating means between said dielectric article and a second ion-repulsive electrode, said second ion generating means being selected from the group consisting of an ionizer and a direct current corona ion generating element; and
(5) applying, independently of a discharge voltage applied to said first ion generating means, a direct current voltage between said second ion-repulsive electrode and said second ion-attractive electrode to produce a second potential difference therebetween, whereby said opposite-polarity ion from said second ion generating means is moved in a direction from said second ion-repulsive electrode to said second ion-attractive electrode due to said second potential difference, and is transferred on said dielectric article.

16. The process according to claim 15, wherein said steps of moving one of said first positive and negative ions and moving said ion having opposite-polarity are carried out at a temperature from room temperature (inclusive) to curie temperature (exclusive) of said dielectric article.

17. The process according to claim 16, wherein a piezoelectric article is manufactured.

18. The process according to claim 15, wherein said steps of moving one of said first positive and negative ions and moving said ion having opposite-polarity are carried out at a temperature from room temperature (inclusive) to a melting point (exclusive) of said dielectric article.

19. The process according to claim 15, wherein each of said first and second ion generating means is an ionizer; a pair of ion-movable electrodes are opposingly located; one ion-movable electrode serves as said first ion-repulsive electrode and also serves as said second ion-attractive electrode; and the other ion-movable electrode serves as said first ion-attractive electrode and also serves as said second ion-repulsive electrode.

20. The process according to claim 15, wherein each of said first and second ion generating means is a direct current corona ion generating element; a counter electrode and a discharge electrode of one direct current corona ion generating element serve as said first ion-repulsive electrode and also serve as said second ion-attractive electrode; and a counter electrode and a discharge electrode of the other direct current corona ion generating element serve as said first ion-attractive electrode and also serve as said second ion-repulsive electrode.

21. An apparatus for an electret treatment of a dielectric article, comprising (1) a first ion-repulsive electrode;

(2) a first ion-attractive electrode opposingly located to said first ion-repulsive electrode;

(3) a second ion-repulsive electrode;

(4) a second ion-attractive electrode opposingly located to said second ion-repulsive electrode;

(5) a means for placing said dielectric article, between a combination of said first ion-repulsive electrode and said first ion-attractive electrode, between a combination of said second ion-repulsive electrode and said second ion-attractive electrode, and apart from each of said first and second ion-repulsive electrodes and said first and second ion-attractive electrodes, so that said first ion-repulsive electrode is located at a side opposite to said second ion-repulsive electrode with respect to said dielectric article, and said first ion-attractive electrode is located at a side opposite to said second ion-attractive electrode with respect to said dielectric article;

(6) a first ion generating means capable of supplying first positive and/or negative ions between said first ion-repulsive electrode and said dielectric article placed by said means for placing said dielectric article, said first ion generating means being selected from the group consisting of an alternating current surface discharge element, an ionizer, an alternating current corona ion generating element, and a direct current corona ion generating element;

(7) a second ion generating means capable of supplying second positive and/or negative ions between said second ion-repulsive electrode and said dielectric article placed by said means for placing said dielectric article, said second ion generating means being selected from the group consisting of an alternating current surface discharge element, an ionizer, an alternating current corona ion generating element, and a direct current corona ion generating element;

(8) a first means for applying, independently of a discharge voltage applied to said first ion generating means, a direct current voltage between said first ion-repulsive electrode and said first ion-attractive electrode to generate a first potential difference therebetween, whereby only one of said first positive and negative ions supplied from said first ion generating means is moved in a direction from said first ion-repulsive electrode to said first ion-attractive electrode, and is transferred to said dielectric article; and (9) a second means for applying, independently of a discharge voltage applied to said second ion generating means, a direct current voltage between said second ion-repulsive electrode and said second ion-attractive electrode to generate a second potential difference therebetween, whereby only said second ion having an opposite-polarity to polarity of said first ion transferred on said dielectric article is moved in a direction from said second ion-repulsive electrode to said second ion-attractive electrode due to said second potential difference, and is transferred on said dielectric article.

22. The apparatus according to claim 21, further comprising a means for heating said dielectric article.

23. The apparatus according to claim 21, wherein each of said first and second ion generating means is an alternating current surface discharge element; a discharge electrode of said alternating current surface discharge element as said first ion generating means serves as said ion-repulsive electrode for ions supplied from said first ion generating means and also serves as said ion-attractive electrode for ions supplied from said second ion generating means; and a discharge electrode of said alternating current surface discharge element as said second ion generating means serves as said ion-repulsive electrode for ions supplied from said second ion generating means and also serves as said ion-attractive electrode for ions supplied from said first ion generating means.

24. The apparatus according to claim 21, wherein each of said first and second ion generating means is an ionizer; a pair of ion-movable electrodes are opposingly located; one ion-movable electrode serves as said first ion-repulsive electrode and also serves as said second ion-attractive electrode; and the other ion-movable electrode serves as said first ion-attractive electrode and also serves as said second ion-repulsive electrode.

25. The apparatus according to claim 21, wherein each of said first and second ion generating means is an alternating current corona ion generating element; an inducing electrode and a discharge electrode of one alternating current corona ion generating element serve as said first ion-repulsive electrode and also serve as said second ion-attractive electrode; and an inducing electrode and a discharge electrode of the other alternating current corona ion generating element serve as said first ion-attractive electrode and also serve as said second ion-repulsive electrode.

26. The apparatus according to claim 21, wherein each of said first and second ion generating means is a direct current corona ion generating element; a counter electrode and a discharge electrode of one direct current corona ion generating element serve as said first ion-repulsive electrode and also serve as said second ion-attractive electrode; and a counter electrode and a discharge electrode of the other direct current corona ion generating element serve as said first ion-attractive electrode and also serve as said second ion-repulsive electrode.

* * * * *

UNITED STATES PATENT AND TRADEMARK OFFICE
CERTIFICATE OF CORRECTION

PATENT NO. : 6,001,299
DATED : December 14, 1999
INVENTOR(S) : Masaaki Kawabe et al It is certified that error appears in the above-identified patent and that said Letters Patent is hereby corrected as shown below:

Column 8,
Line 60, delete "intencity" and insert --intensity--.

Column 11,
Lines 21, 23, and 24, delete "intencity" and insert --intensity--.

Column 12,
Lines 32 and 49, delete "intencity" and insert --intensity--.

Column 20,
Line 41, delete "intencity" and insert --intensity--.

IN THE CLAIMS:

Column 21,
Line 25, delete "first" and insert --second--.

Column 22,
Line 47, delete "first" and insert --second--.

UNITED STATES PATENT AND TRADEMARK OFFICE
CERTIFICATE OF CORRECTION

PATENT NO. : 6,001,299
DATED : December 14, 1999
INVENTOR(S) : Masaaki Kawabe et al It is certified that error appears in the above-identified patent and that said Letters Patent is hereby corrected as shown below:

Column 23,
Line 42, delete "first" and insert --second--.

Column 24,
Line 37, delete "first" and insert --second--; and
Line 49, delete "curie" and insert --Curie--.

Signed and Sealed this

Seventeenth Day of July, 2001

*Attest:*

*Attesting Officer*

NICHOLAS P. GODICI
*Acting Director of the United States Patent and Trademark Office*